United States Patent [19]
Hatanaka et al.

[11] 4,375,523
[45] Mar. 1, 1983

[54] CURABLE SILICONE ELASTOMER COMPOSITION

[75] Inventors: Masayuki Hatanaka, Ora; Atsushi Kurita, Ota; Yoshikane Yokoyama, Tokyo; Masahiro Kusakabe, Yokohama, all of Japan

[73] Assignees: Toshiba Silicone Co., Ltd.; Tokyo Shibaura Denki Kabushiki Kaisha, both of Tokyo, Japan

[21] Appl. No.: 286,069

[22] Filed: Jul. 23, 1981

[30] Foreign Application Priority Data

Jul. 24, 1980 [JP] Japan ................................ 55-100528

[51] Int. Cl.$^3$ ................................................ C08K 9/06
[52] U.S. Cl. ..................................... 523/212; 523/213; 524/406; 528/15; 528/24; 528/31; 528/32
[58] Field of Search ..................... 528/15, 31, 24, 32; 260/37 SB; 525/4; 524/406; 523/212, 213

[56] References Cited

U.S. PATENT DOCUMENTS 3,989,667 11/1976 Lee et al. ............................... 528/32
4,256,616 3/1981 Hatanaka et al. ..................... 528/32
4,276,252 6/1981 Kreis et al. ............................ 528/32

*Primary Examiner*—Melvyn L. Marquis
*Attorney, Agent, or Firm*—Schwartz, Jeffery, Schwaab, Mack, Blumenthal & Koch

[57] ABSTRACT

There is provided herein a curable silicone elastomer composition comprising the following components: (A) 100 parts by weight of a polyorganosiloxane having at least two silicon-bonded vinyl groups per molecule, (B) 1 to 300 parts by weight of fine powders of tungsten carbide and (C) a component for crosslinking of said component (A) selected from the group consisting of (1) a combination of (a) 0.1 to 10 parts by weight of a polyorganohydrogensiloxane having an average of at least two silicon-bonded hydrogen atoms per molecule and (b) 0.000001 to 0.1 part by weight of a platinum catalyst; (2) a combination of said (a), (b) and (c) 0.00001 part to less than 0.1 part by weight of an organic peroxide except from organohydroperoxide; (3) a combination of said (a) and (d) 0.00001 part to less than 0.2 part by weight of the reaction product between said (b) and (c); and (4) 0.1 to 3.0 parts by weight of an organic peroxide except from organohydroperoxide. The composition according to the present invention shows excellent X-ray shielding effect as well as excellent anticoagulative effect, and can give an elastomer of high quality by curing with a broad scope of catalyst systems.

15 Claims, No Drawings

CURABLE SILICONE ELASTOMER COMPOSITION

This invention relates to a curable silicone elastomer composition. More particularly, it pertains to a curable silicone elastomer composition containing tungsten carbide powders formulated therein.

Silicones, particularly silicone elastomers are generally excellent in high-temperature stability and low-temperature resistance. Further, they have excellent electric insulating characteristics and weathering resistance, and exhibit low reactivity in living organisms. Thus, they are used widely as electric insulating materials as well as materials for medical apparatus. In addition, there have been various proposals to incorporate various metallic fine powders into silicone elastomers for uses in electroconductive materials or other special uses. For example, compositions containing fine powders of silver or copper are expected to be useful as electroconductive materials, while those containing fine powders of tungsten are useful as shielding materials against X-rays, contrast medium, vibration insulators, etc. Japanese Patent Publication No. 19878/1978 discloses the advantage of such compositions in application for contrast medium in blood, which causes no coagulation of blood. However, such a silicone elastomer composition containing a large amount of fine powders of tungsten will not be cured on the surface even by hot air vulcanization, when using an organic peroxide as curing catalyst. On the other hand, when using a polyorganohydrogensiloxane having an average of at least two silicon bonded hydrogen atoms per molecule as a crosslinking agent and a platinum compound as catalyst, most of the platinum compound is deactivated by tungsten, thus failing to effect curing. On the contrary, due to too rapid curing, no sufficient working time can be afforded in some cases. For these disadvantages, it has been impossible to obtain commercially stable silicone elastomer.

The present inventors have made extensive studies to overcome the drawbacks of poor curing or scorching in silicone elastomer compositions having incorporated fine powders of transition metals such as tungsten. As a consequence, they were successful in obtaining a silicone elastomer composition exhibiting stable curability by using a platinum catalyst containing no halogen atom in the molecule and a polyorganohydrogensiloxane having an average of at least two silicon bonded hydrogen atoms per molecule as a crosslinking agent, and already filed a patent application therefor (Japanese Patent Provisional Publication No. 45949/1981).

However, this silicone elastomer composition, while having good curability, is insufficient in storage stability of the catalyst itself, and therefore cumbersome operations are necessary for storage of the catalyst, i.e. it is necessary to store an unformulated catalyst under freezing or store it in a sealed tube under a nitrogen atmosphere. In addition, since a platinum catalyst is employed, it is disadvantageously subject to influences by other vulcanization inhibitors such as sulfur compounds or tin compounds.

Under these circumstances, the present inventors have sought a fine powder material having an X-ray shielding effect and anticoagulation properties similar to fine powders of tungsten, and which, when incorporated in a silicone elastomer compound, is suitable for producing elastomers by curing with a broad scope of catalyst systems. It has been found that these desired results are achieved with fine powders of tungsten carbide.

According to the present invention, there is provided a curable silicone elastomer composition comprising the following components (A), (B) and (C):

(A) 100 parts by weight of a polyorganosiloxane having at least two silicon-bonded vinyl groups per molecule;

(B) 1 to 300 parts by weight of fine powders of tungsten carbide; and (C) a component for crosslinking of said component (A) selected from the group consisting of (1), (2), (3) and (4) shown below:

(1) a combination of (a) 0.1 to 10 parts by weight of a polyorganohydrogensiloxane having an average of at least two silicon-bonded hydrogen atoms per molecule and (b) 0.000001 to 0.1 part by weight of a platinum catalyst;

(2) a combination of said (a), (b) and (c) 0.00001 part to less than 0.1 part by weight of an organic peroxide except from organohydroperoxide.

(3) a combination of said (a) and (d) 0.00001 part to less than 0.2 part by weight of the reaction product between said (b) and (c); and (4) 0.1 to 3.0 parts by weight of an organic peroxide except from organohydroperoxide.

The polyorganosiloxane of said (A) to be used in the present invention may have either a straight chain or branched siloxane chain. But, in order to cure to an elastomer, it is required to have at least two silicon-bonded vinyl groups in each molecule. Examples of other organic groups bonded to silicon may include alkyl groups such as methyl, ethyl, propyl, butyl, hexyl, octyl, decyl, dodecyl or others, aryl groups such as phenyl, aralkyl groups such as $\beta$-phenylethyl, substituted hydrocarbyl groups such as 3,3,3-trifluoropropyl; etc. It is also permissible that there may be present hydroxyl groups at the terminal ends of the molecule. Among the organic groups as mentioned above except for vinyl groups, it is preferred to use the combination of methyl and phenyl or only methyl for the reason of good heat resistance and mechanical properties obtained as well as for the reason of easy availability of starting materials and easiness in synthesis. Except for the cases when such properties as low-temperature resistance or radiation resistance are required, it is preferred to use only methyl groups. An uncured composition, which is fluid and to be used for casting or potting, may preferably have an average polymerization degree in the range from 100 to 10,000, and may have a straight or branched siloxane chain. In particular, for ease in synthesis and the good mechanical properties possessed by the cured product, the terminal ends of the molecule may preferably be blocked with dimethyvinylsiloxy groups, the organic groups in other siloxy units being methyl groups. An uncured composition, which is solid and to be press vulcanized or extrusion molded to have high mechanical properties, may preferably be composed of a siloxane chain which is substantially straight chain, having an average polymerization degree in the range from 1,000 to 10,000, more preferably from 3,000 to 10,000. When the average polymerization degree exceeds 10,000, it is difficult to incorporate (B) fine powders of tungsten carbide, (C) crosslinking components and other reinforcing fillers into such a polymer. The vinyl content bonded to silicon atoms is on an average 0.005 to 0.5 mole % based on all organic groups. With a vinyl content less than 0.005%, no good mechanical property can be obtained, while an excess over 0.5% will lower heat resistance.

The salient feature of the present invention resides in use of the fine powders of tungsten carbide (B) in the composition of the present invention, which are found to have good shielding property against X-ray and anticoagulating characteristics without impairing various crosslinking reactions which will cure the component (A) to give a silicone elastomer. The particle size of fine powders of tungsten carbide is not particularly limited, but they may preferably have an average particle size of 50 microns or less in order to be readily formulated into the component (A) and also to give good physical properties and surface smoothness to the silicone elastomer obtained after curing.

The content of fine powders of tungsten carbide to be formulated is 1 to 300 parts by weight, preferably 10 to 100 parts by weight per 100 parts by weight of the component (A). When fine powders of tungsten carbide are contained in an amount less than 1 part by weight, no sufficient X-ray shielding property or anticoagulation property can be exhibited. On the contrary, with an amount exceeding 300 parts by weight, the physical properties of the silicone elastomer obtained after curing are markedly decreased to a great disadvantage.

The crosslinking component (C) to be used in the composition according to the present invention is a system which will crosslink the component (A) into an elastomer and which is selected, as mentioned above, from the group consisting of (1), (2), (3) and (4). The system (1) is constituted of a combination of (a) and (b); (2) of (a), (b) and (c); (3) of (a) and (d).

The polyorganohydrogensiloxane of (a) is a crosslinking agent for the polyorganosiloxane of (A), and may have a siloxane chain which may either be straight chain, branched or cyclic. But it is required to have an average of at least two hydrogen atoms bonded to silicon in each molecule in order to form crosslinked network structures. As the organic groups bonded to silicon atoms, there may be exemplified those mentioned for the polyorganosiloxane (A) as well as vinyl groups. But, methyl groups are preferred for ease in synthesis and heat resistance of the cured product. The average polymerization degree is not particularly limited, but generally preferred to be within the range from 4 to 3,000. A compound with a polymerization degree less than 4 is volatile and difficult to handle, while that exceeding 3,000 is difficult to synthesize.

The content of (a) is in the range from 0.1 to 10 parts by weight per 100 parts by weight of the polyorganosiloxane of (A).

The platinum catalyst (b) is a catalyst which accelerates the hydrosilylating reaction between the polyorganosiloxane of (A) and the polyorganohydrogensiloxane of (a). For example, there may be mentioned chloroplatinic acid, complexes obtained from chloroplatinic acid and an olefin, a silane compound containing an alkenyl group, a polysiloxane containing an alkenyl group, cyclopropane or an alcohol, platinum-organophosphine complex, platinum-organophosphite complex, etc. The valence of the central platinum atom in these platinum catalysts may either be zero, divalent or tetravalent. However, for ease in synthesis and stability of the catalyst system when combined with the (c) component, and also for obtaining an appropriate catalyst activity so as to achieve good workability even when using a polyorganosiloxane having a polymerization degree of 1,000 or more as the component (A), it is preferred that the platinum catalyst (b) should be a zero-valent platinum-phosphorus complex represented by the formula: Pt[PR$^1$$_3$]$_4$ or a divalent platinum-phosphorus complex represented by the formula: Pt[PR$^2$$_3$]$_2$Cl$_2$. In the above formulae, each of R$^1$ and R$^2$ represents a monovalent group selected from the group consisting of monovalent hydrocarbyl groups, alkoxy groups and aryloxy groups.

The content of the platinum catalyst (b) in the composition is determined depending on the working time required in terms of curability, but generally will be in the range from 0.000001 to 0.1 part by weight, preferably from 0.00005 to 0.01 part by weight per 100 parts by weight of the polyorganosiloxane (A). With an amount less than 0.000001 part by weight, the catalytic effect is small, while an amount in excess of 0.1 part by weight does not give a result in proportion thereto thereby accruing an economic disadvantage.

The (1) of (C) to be used in the composition according to the present invention is constituted of the above components (a) and (b). Such a system involves a problem with respect to stability of the platinum catalyst. In particular, when there is employed a polyorganosiloxane (A) with a high polymerization degree of 1,000 or more, the crosslinking speed is too high to afford long working time. In contrast, a system employing (2) or (3) as (C) can permit the catalyst system to be stable at room temperature, thus giving advantageously good workability.

As the component (b) in this case, it is preferred to use a zero-valent or divalent platinum-phosphorus complex as mentioned above. The organic peroxide (c) functions to inhibit the catalytic activity of the platinum catalyst of (b) at normal temperature but to enhance said activity at the time of heating. Examples are dialkylperoxide and derivatives thereof such as di-t-butylperoxide, 2,5-dimethyl-2,5-di(t-butylperoxy)hexane, 2,5-dimethyl-2,5-di(t-butylperoxy)hexyne-3, dicumylperoxide, t-butylcumylperoxide, α,α-bis(t-butylperoxide)isopropylbenzene; diacylperoxide such as benzoylperoxide, p-chlorobenzoylperoxide, m-chlorobenzoylperoxide, 2,4-dichlorobenzoylperoxide, dilauroylperoxide; peracid ester such as perbenzoic acid t-butylperoxybenzoate; peroxydicarbonate such as diisopropylperoxycarbonate, di(2-ethylhexyl)peroxycarbonate; peroxyketal such as 1,1-di(t-butylperoxy)cyclohexane, 1,1-di(t-butylperoxy)-3,3,5-trimethylcyclohexane; and so on. Among organic peroxides, those having hydroperoxide groups in the molecule will cause foaming of the composition during curing and therefore are not suitable for the object of the present invention.

The content of (c) in the composition is at least 0.00001 part by weight, but less than 0.1 part by weight per 100 parts by weight of the polyorganosiloxane of (A), but preferably 10 to 1,000 equivalents based on the platinum catalyst (b). With an amount less than 0.00001 part by weight, the object of addition of (c), namely catalyst inhibiting effect at normal temperature is not sufficient. On the other hand, use of 0.1 part by weight or more does not give an increased effect and accrues an economic disadvantage.

In (d), (b) and (c) are previously reacted and combined with (a), in place of combining (b) and (c) with (a), to achieve a similar effect. The reaction product (d) between (b) and (c) can be prepared by, for example, dissolving (b) in a suitable solvent such as toluene, ether, chloroform, carbon tetrachloride, etc. and adding a predetermined amount of (c) to the resultant solution, followed by heating to 40°–50° C. The reactants (b) and (c) may preferably be added at a ratio in the range from 10 to 1,000 equivalents of (c) per one equivalent of the platinum catalyst (b). The amount of (d) added is at least 0.00001 part by weight, but less than 0.2 part by weight, preferably in the range from 0.00005 to 0.1 part by weight, per 100 parts by weight of the polyorganosiloxane (A). When (d) is less than 0.00001 part by weight, there is no catalytic effect, while use of 0.2 part by weight or more is meaningless without any additional effect resulting from the increased amount.

In the composition according to the present invention, there are used fine powders of tungsten carbide (B) in place of the fine powders of tungsten used in the prior art and its object can sufficiently be achieved by using the organic peroxide of (4) in curing of the polyorganosiloxane of (A). This cannot be predicted from the prior art case using fine powders of tungsten. Particularly, when there are present in the system sulfur compounds or tin compounds poisonous to the platinum catalyst or the composition is required to be cured while being in contact with these compounds, it is recommended to use (4) as (C). Examples of (4) may include those as mentioned for the above (c). Hydroperoxides are excluded, since they are not effective for crosslinking of (A).

The content of (4) is 0.1 to 3.0 parts by weight per 100 parts by weight of the polyorganosiloxane (A). At a level less than 0.1 part by weight, no sufficient curing can be effected, while an amount in excess of 3.0 parts by weight will worsen the heat resistance and also is economically disadvantageous.

The composition of the present invention, which comprises formulating (B) and (C) with (A), may also contain other inorganic fine powders, when further mechanical properties are required. As such inorganic fine powders, fine powders of silica are preferred, since they have greater reinforcing effect and little effect on the platinum catalyst. As fine powdery silicas, there may be mentioned fumed silica, precipitated silica and calcined silica. These fine powdery silicas, due to the polarity and hydrophilic character of silanol groups present in great amounts on the surface thereof, may cause deleterious effects on workability of the composition as well as on the electrical or mechanical properties of the cured product. Accordingly, depending on the intended purposes, it is recommended that the surface of these fine powdery silicas be treated with an organic silicon compound such as a linear polyorganosiloxane, cyclic polyorganosiloxane or hexamethyldisilazane, etc. When no reinforcing effect is necessary, but only an increase in hardness is desirable, there may also be used powders with relatively greater particle sizes such as crushed quartz, or alternatively short glass fibers or carbon black depending on the intended use. These inorganic fine powders may preferably be added in an amount of not more than 300 parts by weight, more preferably from 10 to 100 parts by weight, per 100 parts by weight of the polyorganosiloxane (A). With an amount less than 10 parts by weight, no reinforcing effect can be obtained. On the other hand, with an amount in excess of 300 parts by weight, the powders are difficult to blend and the resultant silicone elastomer will be too rigid, thereby lowering its elongation and elasticity.

In addition, there may also be added a process aid, such as a low molecular weight polyorganosiloxane having hydroxyl or alkoxy groups at the terminal ends, into the composition according to the present invention.

The composition of the present invention can provide a silicone elastomer exhibiting excellent X-ray shielding effect and anticoagulative property by using any of the systems shown as (C) to thereby effect curing by heating under a relatively broad scope of conditions.

Further, by using the composition of the present invention, conventional techniques of processing silicone elastomers, namely casting or potting in case of the component (A) having an average polymerization degree of 100 to 1,000, or press molding, calendering or continuous extrusion molding in case of the component (A) having a polymerization degree of 1,000 or more, can be practiced to effect molding in any desired shape such as tubes, rods, sheets or any other shape, followed by heating to be cured into silicone elastomers. The silicone elastomer product obtained by using the composition of the present invention is especially suitable for such uses as X-ray shielding plate, cathether for contrast medium.

The present invention is further explained with reference to the following Examples and Comparative examples. In the Examples and Comparative examples, all parts represent parts by weight and the compositions and the elastomers obtained therefrom are indicated by the same numerals. Also, for brevity of the description, the following symbols are used.

Bu: butyl group, Ph: phenyl group

EXAMPLE 1

Preparation of the composition

Base compound A was prepared by kneading in a dough mixer 100 parts of a polyorganosiloxane having its terminal ends blocked with trimethylsiloxy groups and having an average polymerization degree of 7,000 consisting of 0.2 mole % of methylvinylsiloxy units and 99.8 mole % of dimethylsiloxy units, 5 parts of α,ω-dihydroxypolydimethylsiloxane having a viscosity of 50 cSt at 25° C. as process aid, 55 parts of fumed silica treated on the surface with polydimethylsiloxane and 15 parts of fine powder of tungsten carbide having an average particle size of 2 microns. With 100 parts of this base compound A, the crosslinking agents and the catalysts as indicated in Table 1 were compounded on a two roll mill to provide compositions 11 to 14. The polymethylhydrogensiloxane E used as the crosslinking agent consisted of 60 mole % of methylhydrogensiloxy units and 40 mole % of dimethylsiloxy units, with the terminal ends blocked with trimethylsilyl groups, having a viscosity at 25° C. to 30 cSt.

| Composition No. | Polymethyl-hydrogensilo-xane added (part) | Organic peroxide Kind | Amount (part) | Platinum catalyst Kind | Amount (part) |
| --- | --- | --- | --- | --- | --- |
| 11 | — | 2,4-dichlorobenzoylperoxide | 0.8 | — | — |

-continued

| Composition No. | Polymethylhydrogensiloxane added (part) | Organic peroxide Kind | Amount (part) | Platinum catalyst Kind | Amount (part) |
|---|---|---|---|---|---|
| 12 | — | di-t-butyl peroxide | 0.6 | — | — |
| 13 | 1.0 | — | — | Pt[P(OBu)$_3$]$_2$Cl$_2$ | 0.001 |
| 14 | 1.0 | 2,5-dimethyl-2,5-di-(t-butylperoxy)-hexyne-3 | 0.01 | Pt[P(OPh)$_3$]$_4$ | 0.0005 |

Experiment I: preparation of sheets and measurement of physical properties

The compositions 11 to 14 were subjected to press cure under the conditions shown in Table 2 to prepare sheets 2 mm thick. These sheets were post-cured at 200° C. for 2 hours and then subjected to measurement of physical properties according to JIS K6301. The results are shown in Table 2.

TABLE 2

| | Composition No. | | | |
|---|---|---|---|---|
| | 11 | 12 | 13 | 14 |
| Press cure conditions | | | | |
| Temperature, °C. | 120 | 175 | 170 | 170 |
| Time, min. | 10 | 10 | 10 | 10 |
| Physical properties | | | | |
| Hardness (JIS) | 68 | 67 | 72 | 73 |
| Tensile strength, kg/cm$^2$ | 62 | 64 | 60 | 58 |
| Elongation, % | 300 | 330 | 300 | 280 |
| Tear strength, kg/cm (B-type) | 14 | 14 | 16 | 17 |

Experiment II: Preparation of tubes and measurement of resistance to coagulation The compositions 11, 13 and 14 were extruded through an extruder into tubes of 1.2 mm in outer diameter and 0.6 mm in inner diameter and, while being extruded, they were vulcanized in hot air at 300° C. for 3 minutes to provide silicone elastomer tubes. After post-cure at 200° C. for 4 hours, followed by sterilization by boiling in distilled water for 30 minutes, they were cut into lengths of 10 cm, to give five samples a to e for each of 11, 13 and 14. Base compound B was also prepared by omitting fine powders of tungsten carbide from the base compound A as described above. With 100 parts of the base compound B is compounded 0.8 part of 2,4-dichlorobenzoylperoxide on a two roll mill to prepare Comparative example composition 15. This composition was similarly extrusion molded, vulcanized, sterilized and cut to obtain Comparative samples 15 a to e. These samples and comparative samples were transplanted separately into large veins of rats. After one week, they were taken out for examination of the presence or absence of coagulation. These results are shown in Table 3.

TABLE 3

| Sample No. | | Presence of Coagulation | Situation of Coagulation |
|---|---|---|---|
| 11 | a | None | Cross-section of silicone elastomer |
| | b | " | |
| | c | None | |
| | d | None | |
| | e | None | |
| 13 | a | None | |
| | b | None | |

TABLE 3-continued

| Sample No. | | Presence of Coagulation | Situation of Coagulation |
|---|---|---|---|
| | c | None | |
| | d | None | |
| | e | None | |
| 14 | a | None | |
| | b | None | |
| | c | None | |
| | d | None | |
| | e | None | |
| 15 (Comparative example) | a | " | All around the silicone elastomer tube |
| | b | " | All around the silicone elastomer tube |
| | c | " | All around the silicon elastomer tube |
| | d | " | All around the silicone elastomer tube |
| | e | " | All around the silicone elastomer tube |

EXAMPLE 2

A base compound C was prepared by kneading in a dough mixer 100 parts by weight of a polyorganosiloxane consisting of 0.16 mole % of methylvinylsiloxy units and 99.84 mole % of dimethylsiloxy units, having an average polymerization degree of 5,000, with the terminal ends blocked with dimethylvinylsilyl groups, 2 parts of a polydiorganosiloxane consisting of 33 mole % of diphenylsiloxy units and 67 mole % of dimethylsiloxy units, having a viscosity of 10 cSt at 25° C., with the terminal ends blocked with methoxy groups and 50 parts of fumed silica treated on the surface with hexamethyldisilazane. With 100 parts of this base compound C, 5 parts of fine powder of tungsten carbide having an average particle diameter of 5 microns and 2.0 parts of benzoylperoxide were compounded on a two roll mill to prepare a composition. This composition was press vulcanized at 120° C. for 10 minutes to prepare sheets having various thicknesses as shown in Table 4. Measurement of X-ray absorption by these sheets gave the results shown in Table 4.

TABLE 4

| Sample thickness, mm | 1.0 | 3.0 | 6.0 | 10.0 |
|---|---|---|---|---|
| X-ray transmittance, mR | 6.64 | 2.79 | 0.73 | 0.12 |

Conditions:
Plate voltage 26 KV
Current 157 mA
X-ray dosage 12.5 mR

EXAMPLE 3

Base compound D was prepared by kneading in a dough mixer 100 parts of a polyorganosiloxane consisting of 0.2 mole % of methylvinylsiloxy units, 5.0 mole % of diphenylsiloxy units and 94.8 mole % of dimethylsiloxy units, having an average polymerization degree of 6,000, with the terminal ends blocked with hydroxyl groups, 40 parts of fumed silica treated on the surface with polydimethylsiloxane and 25 parts of fine quartz powder. With 100 parts of this base compound D, the fine powder of tungsten carbide having an average particle size of 0.9 microns in amounts as indicated in Table 5 and 1.5 parts of 2,4-dichlorobenzoylperoxide were mixed on a two roll mill to prepare the compositions 31 to 34. It should be noted that the composition 31 is presented as a comparative example. From these compositions, five samples of tube a to e for each of 41 to 44 were prepared by the same process as in Experiment II in Example 1. Table 5 shows the results of coagulation resistance tests of these samples, conducted in the same way as in Experiment II in Example 1.

TABLE 5

| Sample No. | Amount of tungsten carbide (parts) | Number of samples adhered with coagulation |
|---|---|---|
| 31 a–e (Comparative example) | 0.5 | 4 |
| 32 a–e | 1.1 | 1 |
| 33 a–e | 10.0 | 0 |
| 34 a–e | 50.0 | 0 |

EXAMPLE 4

Compositions 41–46 were prepared by compounding 100 parts of the base compound C obtained in Example 2 with the components indicated in Table 6. The fine powder of tungsten carbide employed had an average particle size of 0.9 microns, and among polyorganohydrogensiloxanes, E was the same as used in Example 1, and F and G are as shown below:

F: polymethylhydrogensiloxane consisting of methylhydrogensiloxane units, having a viscosity of 40 cSt at 25° C., with the terminal ends blocked with trimethylsilyl group;

(1) Each composition was left to stand at 50° C. for one week and the changes in its state were observed.

(2) Press cures were carried out under the following conditions to prepare sheets 1 mm thick, followed by post-cure at 200° C. for 5 hours:

| Compositions 41–44 | 160° C., 10 min. |
| Composition 45 | 140° C., 10 min. |
| Composition 46 | 100° C., 10 min. |

(3) Using the compositions after being left to stand in the Experiment (1), vulcanized sheets were prepared under the same conditions as in (2).

(4) While extrusion molding the compositions 41 and 44, hot air vulcanization was effected at 300° C. for 4 minutes, followed further by post-cure at 200° C. for 5 hours, to prepare silicone elastomer tubes of 1.2 mm in outer diameter and 0.6 mm in inner diameter.

(5) Anticoagulative characteristics were tested for the silicone elastomer tubes prepared in the Experiment (4), in the same way as in Experiment II in Example 1.

As the result of the above experiments, in none of the compositions, was there observed any change of state such as gel formation, but there were obtained good silicone elastomer sheets in Experiments (2) and (3) and good silicone elastomer tubes in Experiment (4). In Experiment (5), there occurred no coagulation at all.

EXAMPLE 5

A composition was prepared by compounding on a two roll mill 100 parts of the base compound A prepared in Example 1, 0.7 part of polymethylhydrogensiloxane as used in Example 4 and 0.006 of the reaction product obtained by reacting 2,5-dimethyl-2,5-di(t-butylperoxy)hexane with 20 wt. % of Pt[P(OPh)$_3$]$_4$ in ethyleneglycol dimethylether. The same experiments (1) to (5) as in Example 4 were conducted for this com-

TABLE 6

| Composition No. | Amount of fine powders of tungsten caribide (part) | Polyorganohydrogen siloxane Kinds | Polyorganohydrogen siloxane Amount added (part) | Organic peroxide Kinds | Organic peroxide Amount added (part) | Platinum catalyst Kinds | Platinum catalyst Amount added (part) |
|---|---|---|---|---|---|---|---|
| 41 | 10 | E | 1.0 | 2,5-dimethyl-2,5-di(t-butyl-peroxy)hexane | 0.01 | Pt[P(OBu)$_3$]$_2$Cl$_2$ | 0.0005 |
| 42 | 4 | F | 0.8 | 2,5-dimethyl-2,5-di(t-butyl-peroxy)hexane | 0.01 | " | 0.0005 |
| 43 | 10 | G | 0.6 | 2,5-dimethyl-2,5-di(t-butyl-peroxy)hexane | 0.01 | Pt[P(OPh)$_3$]$_4$ | 0.001 |
| 44 | 10 | E | 1.0 | t-butylcumyl-peroxide | 0.01 | Pt[Ph$_3$P]$_4$ | 0.001 |
| 45 | 6 | E | 1.0 | 1,1-bis(t-butylperoxy)-3,3,5-trimethyl cyclohexane | 0.01 | Pt[P(OPh)$_3$]$_2$Cl$_2$ | 0.001 |
| 46 | 10 | H | 0.7 | benzoyl peroxide | 0.01 | Pt[P(OPh)$_3$]$_4$ | 0.001 |

G: polymethylhydrogensiloxane consisting of H(CH$_3$)$_2$SiO$_{\frac{1}{2}}$ units and SiO$_2$ units, containing 0.8 wt. % of hydrogen atoms bonded to silicon atom, having a viscosity of 20 cSt at 25° C.;

H: 1-butyl-1,3,5,7-tetramethylcyclotetrasiloxane

The following experiments were conducted for these compositions:

position, but the press cures were performed under the conditions of 160° C. and 10 minutes. In Experiment (1), there was observed no change of state such as gel formation at all, and good silicone elastomers were obtained in Experiments (2) to (4). In Experiment (5), no coagulation was observed at all.

For comparison, using the base compound B in place of the base compound A, the Experiments (4) and (5)

were conducted. In Experiment (4), a good silicone elastomer tube was obtained, but, in Experiment (5), the occurrence of coagulation was observed in each sample.

We claim:

1. A curable silicone elastomer composition comprising the following components (A), (B) and (C):
   (A) 100 parts by weight of a polyorganosiloxane having at least two silicon-bonded vinyl groups per molecule;
   (B) 1 to 300 parts by weight of fine powder of tungsten carbide; and
   (C) a component for crosslinking of said component (A) selected from the group consisting of (1), (2), (3) and (4) shown below:
      (1) a combination of (a) 0.1 to 10 parts by weight of a polyorganohydrogen-siloxane having an average of at least two silicon-bonded hydrogen atoms per molecule and (b) 0.000001 to 0.1 part by weight of a platinum catalyst;
      (2) a combination of said (a), (b) and (c) 0.00001 part to less than 0.1 part by weight of an organic peroxide except from organohydroperoxide;
      (3) a combination of said (a) and (d) 0.00001 part to less than 0.2 part by weight of the reaction product between said (b) and (c); and
      (4) 0.1 to 3.0 parts by weight of an organic peroxide except from organohydroperoxide.

2. A composition according to claim 1, wherein the organic groups bonded to silicon atom in the polyorganosiloxane of (A) consist of methyl and vinyl groups.

3. A composition according to claim 1, wherein 0.005 to 0.5 mol % on an average of the organic groups bonded to silicon atom in the polyorganosiloxane of (A) are vinyl groups.

4. A composition according to claim 1, wherein the average polymerization degree of the polyorganosiloxane of (A) is in the range from 100 to 10,000.

5. A composition according to claim 4, wherein the average polymerization degree of the polyorganosiloxane of (A) is in the range from 3,000 to 10,000.

6. A composition according to claim 1, wherein the terminal ends of the polyorganosiloxane of (A) are blocked with dimethylvinylsiloxy groups.

7. A composition according to claim 1, wherein the average particle size of said tungsten carbide powder (B) is at most 50 microns.

8. A composition according to claim 1, wherein the amount of (B) is 10 to 100 parts by weight.

9. A composition according to claim 1, wherein (C) is the crosslinking component (2) or (3).

10. A composition according to claim 9, wherein the platinum catalyst (b) in (C) is a zero-valent platinum-phosphorus complex represented by the formula:

$$Pt[PR^1_3]_4,$$

wherein $R^1$ is a monovalent group selected from the group consisting of monovalent hydrocarbon groups, alkoxy groups and aryloxy groups.

11. A composition according to claim 9, wherein the platinum catalyst (b) in (C) is a divalent platinum-phosphorus complex represented by the formula:

$$Pt[PR^2_3]_2Cl_2,$$

wherein $R^2$ is a monovalent group selected from the group consisting of monovalent hydrocarbon groups, alkoxy groups and aryloxy groups.

12. A composition according to claim 1, wherein the amount of the organic peroxide (c) in (C) is 10 to 1,000 equivalents of the platinum catalyst (b).

13. A composition according to claim 1, wherein the amount of the reaction product (d) in (C) is 0.00005 to 0.1 part by weight.

14. A composition according to claim 1, further containing 10 to 100 parts by weight of fine powders of silica.

15. A composition according to claim 14, wherein the surface of the fine powders of silica is treated with an organic silicon compound selected from the group consisting of polyorganosiloxane and hexamethyldisilazane.

* * * * *